Jan. 21, 1969     J. S. ECKERT     3,423,032
METHOD AND APPARATUS FOR COMMINUTION
Original Filed June 9, 1965
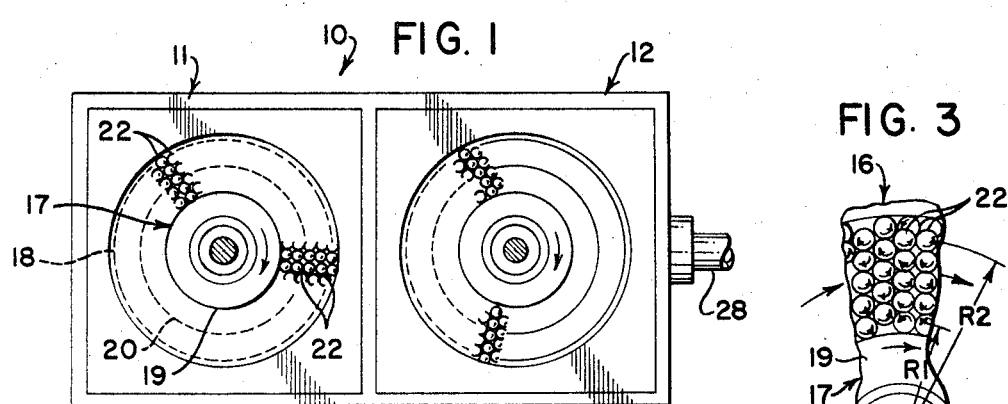
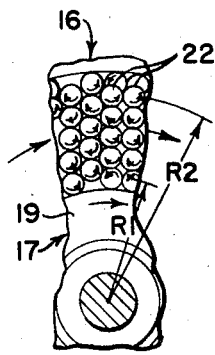
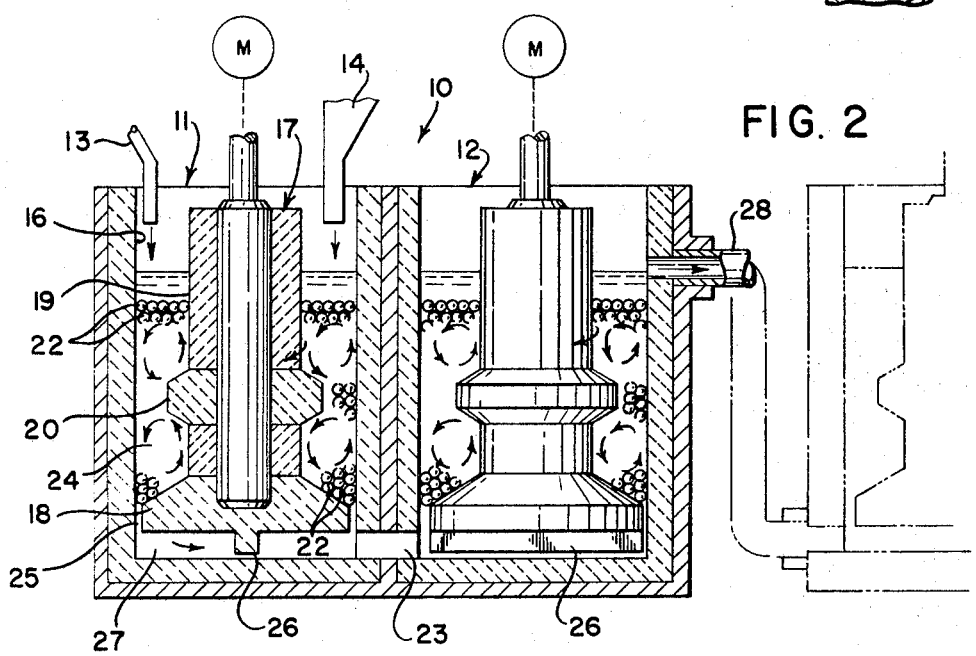
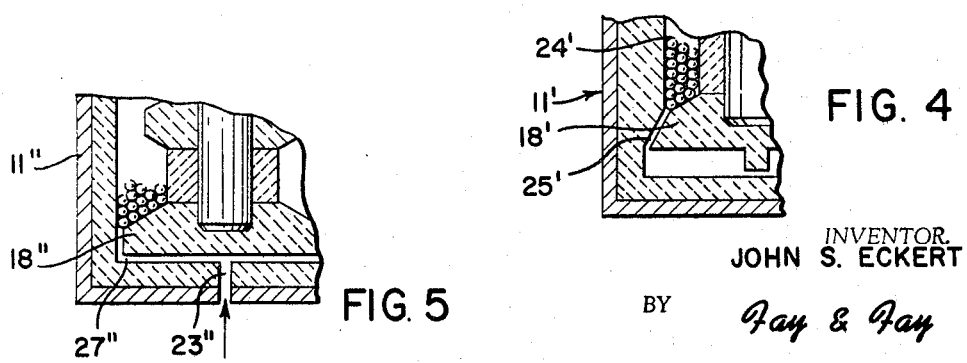
INVENTOR.
JOHN S. ECKERT
BY 
ATTORNEY United States Patent Office 3,423,032
Patented Jan. 21, 1969

3,423,032
METHOD AND APPARATUS FOR COMMINUTION
John S. Eckert, Silver Lake, Ohio, assignor, by mesne assignments, to U.S. Stoneware, Inc., a corporation of Massachusetts
Continuation of application Ser. No. 462,669, June 9, 1965, which is a continuation-in-part of application Ser. No. 303,736, Aug. 22, 1963. This application Aug. 5, 1966, Ser. No. 571,160
U.S. Cl. 241—15          12 Claims
Int. Cl. B02c 15/00, 17/04

This invention relates to the method of comminuting a solid in a liquid, or comminuting one liquid within another liquid in which it is immiscible, and it includes apparatus for carrying on the process. This application is a continuation of my application Ser. No. 462,669, filed June 9, 1965, now abandoned, which, in turn, is a continuation-in-part of my application Ser. No. 303,736, filed Aug. 22, 1963, and now abandoned. The invention will be described more particularly as applied to the treatment of a solid in a liquid.

The comminuting operation is carried out in an upright vessel containing substantially spherical grinding elements or balls which are agitated by an agitator or rotor having a vertical axis which is usually concentric with the vessel. The agitator and vessel are both preferably cylindrical. Any horizontal cross section of the agitator is free of elongated projections or indentations. There is enough clearance between the wall of the agitator and the wall of the vessel to provide violent agitation of the balls, preferably this clearance is at least equal to three times the average diameter of the grinding elements and not more than 5 or 6 diameters. The wall of the vessel is free of elongated projections or indentations. The agitator preferably includes one or more driving or intensifying rings or portions of larger diameter than the balance of the agitator. The upper and lower surfaces of the intensifying rings being preferably tapered from the agitator toward the vessel wall. The perimeter of each intensifying ring is far enough from the wall of the vessel to permit agitation of the grinding elements.

In a preferred embodiment, the agitator rotates inside the stationary vessel. However, instead of rotating the agitator, the vessel may be rotated about the agitator or the vessel and agitator may be rotated in opposite directions with respect to each other. A dry, solid material to be comminuted is passed down through the vessel for dry grinding. In dry grinding though the coarse material may be introduced at the top and pass down. The fine material is usually removed out the top by means of an air current. For wet grinding, a solid may be passed either up or down through the vessel. A liquid to be emulsified may be passed either up or down through the vessel. The material to be ground is comminuted in three ways: (1) between the various grinding elements or balls, (2) between the agitator, vessel walls and the grinding balls, and (3) between the agitator and the walls of the vessel.

To understand clearly the overall grinding action, the working principles of the comminuting process are described in three stages: (1) grinding action within a single row of grinding balls, (2) the grinding action with one layer of grinding balls, and finally (3) the grinding action between many layers of grinding balls. This is one explanation on how this comminuting process works, but does not purport to be the only one.

The differential rotating speed of the grinding elements in the vessel is one of the key factors to the operation of the grinding process and must be clearly understood.

Consider first the movement of grinding elements aligned in a single row. As the agitator rotates, friction between the agitator and the grinding ball adjacent to and touching the agitator causes the agitator to turn the ball in a direction opposite to that of the agitator. It is important to note that slippage between the agitator and the grinding element causes the grinding element to rotate slower than the agitator. As this grinding element turns, it in turn imparts rotary motion to the next adjacent grinding element. Again, slippage causes this second grinding element to turn slower than the first. This second grinding element rotates in a direction opposite to the first one, or in fact, in the same direction as the agitator. Each successive grinding element thus begins to turn, at different speeds.

A simple analogy is to consider a series of circular, meshed gears arranged in a row. When the gear at one end begins to turn, it imparts rotary motion to every gear in the gear train. That is in essence what happens in the row of grinding elements with partial slip as an added element. It is obvious that the rotary motion of the agitator successively turns all the grinding elements in the row, and that each succeeding element farther away from the agitator turns at a rate of speed that is slower than that of its neighbor nearer the agitator because of slippage between elements. For all practical purposes the grinding elements rotate about a vertical axis.

Note that, before the agitator begins to rotate, the contact relationship between the grinding elements is one of point contact. When the agitator turns, this relationship changes from one of stationary point contact to one of moving point contact, in effect discribing a line contact.

Consider next the grinding action in an entire layer of grinding balls. The rotating motion of each grinding ball in a row is now not only the product of the rotary force imparted to it by the adjacent ball within a row, but also of the rotary forces imparted by grinding balls in adjacent rows. In this case it can still be presumed that all grinding elements rotate about vertical axes.

It is evident that the rotating pattern of each grinding element is compounded because many of the grinding elements are subjected to slippage and forces acting in opposite directions.

Finally, consider the rotating action of the grinding balls in a layer, sandwiched between two other layers. It becomes apparent that in addition to the rotating forces, adjacent grinding balls within a row exert upon each other, the rotation of any one grinding ball in the center layer is further compounded by the rotating forces exerted by adjacent grinding elements above and below.

The reason for this is that when the vessel is filled with generally spherical grinding elements, their spheroidal characteristics cause them to fall or stack into a tetrahedral arrangement. It will be noted that the generally spherical grinding elements are disposed in what might be defined as a continuum so that both during the rotation of the agitator and while it is at rest, the distance between the centers of adjacent contacting elements remain substantially equal to the diameters thereof thereby producing no significant expansion of the body of grinding elements during operation of the apparatus. It will also be noted that the same number of balls are contained in any given space at any point equidistant from the axis of the rotor. A tetrahedron is a regular, four-sided figure, each side consisting of an equilateral triangle. Again, an analogy would be a three-sided pyramid whose base and sides are equilateral triangles. It is apparent that any one ball in the tetrahedral stacking arrangement touches three others and when all rotate, they exert on each other differential, rotary forces in various directions. As mill speed increases, the balls tend to move to a cubic arrangement because of the large tetrahedral forces.

When the vessel is filled with grinding balls, it now becomes evident that the direction of rotation of any one ball in the vessel changes continuously because it is affected by the resultant forces of many, continuously changing line of contact. This insures that no one portion of the spherical surface of a ball wears more than the remaining portions of the surface, and in fact, insures that all surfaces of the balls wear evenly.

In addition to rotating about their own centers, the grinding elements (and the mixture being ground) also move rotatively about the agitator. The tapered design of the intensifying rings prevents the balls from remaining stationary. Instead, the intensifying ring tends to force and move the balls slowly outward radially, away from the agitator toward the vessel wall, and gently upward in a pattern as suggested by arrows in FIG. 2. This further compounds the rotation of each ball, and produces the slowly rotating pattern wherein each ball rotates about a constantly changing axis.

In a preferred wet grinding operation, the material to be ground is suspended in water or other liquid, preferably as a slurry. It flows down through one such grinding vessel filled with grinding balls where it undergoes an initial grinding process. The slurry then goes up through a second such vessel where it undergoes further finer grinding. Still further grinding may be effected by passing the slurry through additional grinding vessels.

Each particle in the material being ground becomes gradually and progressively smaller. When the particles are small enough to pass between the agitator intensifying ring and the vessel wall, they flow into a passageway which connects two adjacent comminution vessels.

The reason the finer particles are forced out of the first vessel into the adjacent vessel is the following. The level of the mixture of slurry in two adjacent vessels is the same. As more water and material is added to the first vessel, water is displaced into the adjacent vessel through a connecting channel that joins the bases of the vessels. Since large particles cannot pass through the clearance between the agitator and the bottom wall of the vessel, only the smaller ones pass (in suspension) in the continuous fluid stream from one vessel to the other.

Note that the fluid flows downward in the first vessel, upward in the second.

As a particle in suspension travels upward through the second vessel, it is subjected to additional grinding between the grinding elements in this vessel before reaching a drain conduit.

The grinding elements are of the type normally used in ball mills and the like. They are essentially spherical and preferably of the same size. They may be of any composition known to the art—for example, steel, porcelain, rocks, pebbles, etc. To prevent metal contamination, the process may be carried out in a ceramic vessel using a ceramic covered agitator and agitating elements. Note that one of the most important distinctions between this invention and the prior art is the fact that in this invention grinding is done by constant shearing and crushing of the material being ground instead of impacting. The importance of this distinction lies in the fact that the grinding balls are not subjected to impacting and uneven wear as they are in other inventions.

Furthermore, the comminuting action of the grinding balls on the material being pulverized is uniform, continuous, and even.

With the foregoing problems in mind, it is an object of this invention to provide a method for grinding materials economically.

It is a further object of this invention to provide a method wherein the material to be ground is comminuted evenly, uniformly, and continuously.

It is a further object of this invention to provide a comminuting method which allows the grinding elements to wear evenly and uniformly.

It is a further object of this invention to enable two adjacent comminuting vessels to grind material to different sizes.

Other objects and aspects of the invention will become apparent from the following description of the preferred form of the invention shown and described in the specification and drawings, which forms a part of the specification, and wherein similar parts are identified by like reference characters in the various parts of the drawings.

In the drawings:

FIG. 1 is a plane view of a first and second vessel located side-by-side for a two-stage comminuting operation;

FIG. 2 is an elevation in section of the same, and indicates in phantom lines how the series can be expanded;

FIG. 3 is a diagram which is helpful in understanding the comminuting action which takes place in the vessel; and FIG. 4 is an elevational detail which shows a modified form of outlet.

FIG. 5 is a partial elevated view showing an adjustable agitator.

In referring to the drawings, the process of wet-grinding a solid will be described more particularly. It is to be understood that the same equipment and process are used for dry-grinding and emulsifying, except that usually, only a central vessel is used for the latter process.

In FIGS. 1 and 2, numeral 10 represents two vessels 11 and 12 side-by-side. The liquid and suspended matter in vessel 11 flow downward, however, in vessel 12 the liquid and suspended matter flow upward. The liquid is supplied through any inlet 13 and the solid is supplied through a feed device such as the hopper at 14. The feed of both the solid and liquid is preferably continuous.

The agitator 17 is suspended, and driven by a motor M. The agitator has a circular base 18, the top of which slopes outwardly and downward toward the wall 16 of the vessel. The major portions 19 of the agitator are of smaller diameter and interrupted by an intensifying ring 20 of larger diameter than the portions 19.

The upper surface of the intensifying ring 20 slants downward and outwardly while its lower surface slants upward and outwardly, increasing the area of the surface of the intensifying ring in contact with grinding elements or balls 22.

The ratio of the height of the agitating vessel to its diameter may be any desired value, except that the balls must not be too remote from the agitator. The size of the agitator may likewise vary, being large enough and rotating fast enough to insure agitation of the grinding elements adjacent the wall of the vessel. The balls 22 fill the grinding zone 24. The balls may be above the level of the liquid suspension, however, ordinarily the liquid suspension covers the balls as illustrated in FIG. 2.

As the agitator 17 rotates, the balls 22 roll against one another grinding the solid between them. FIG. 3 illustrates the effect of the rotating agitator on balls 22 which are at different distances from the agitator. The balls adjacent the agitator are at a distance R1 from the axis of the agitator, and the balls near the wall 16 are substantially twice this distance away from the axis of the agitator or a distance R2. The balls adjacent the agitator turn at substantially the surface speed of the agitator. These balls impart rotation to the balls adjacent to them and in this manner the rotating action is transferred from one ball to the next. The solid in suspension is ground between the rolling and rotating actions of the balls.

The small arrows in FIG. 2 show that the balls turn about their own centers. The small arrows in FIG. 3 indicate that in addition the balls also turn about the agitator.

Vessel 11 may be used alone for dry-grinding a solid or emulsifying one liquid in another. If a two-stage operation is utilized as in wet-grinding, it is necessary to provide a continuous flow of liquid downward through vessel 11, out through some connecting passage such as 23, into and then upward through vessel 12.

The diameter of the grinding balls 22 is larger than the space 25 between the base 18 of the agitator and the adjacent wall 16 of the vessel, so the balls are retained in the grinding zone 24.

Particles of ground matter that are too large to pass through space 25 remains in the grinding vessel 11 until they are ground to a small enough size to pass through space 15 into space 27.

The blade 26 at the bottom of the agitator 17 agitates the fines at the bottom of the vessel in area 27 and prevents them from separating from the liquid by keeping them in suspension.

The continuous flow of water through inlet 13 creates a gentle, streamlike flow through passage 23 allowing the liquid to carry the fine particles in suspension into vessel 12. The particles in suspension are further ground as they move upward through the agitator balls 22 in vessel 12. The mixture then flows out through outlet 28.

The agitator and balls in vessel 12 are of the same construction as those in vessel 11. The larger particles remain in vessel 12 and the smaller ones rise to the top and flow out through outlet 28.

Thus, there is a classification of the ground particles and only the fine ones pass through outlet 28. Controlling the rate of flow of the liquid suspension through vessel 12 determines the rate of the particles which are allowed to flow upward out and through the outlet 28.

If additional vessels are needed, the outlet 28 is preferably connected to the bottom of the subsequent vessel as shown in FIG. 2 in phantom lines, so that the suspension must again flow upward in each subsequent vessel.

FIG. 4 shows a modified type of outlet for a vessel in which the suspension flows downward and out. The bottom inner wall of vessel 11 widens to accommodate the widened base 18' of the agitator. The suspension flows out between them in passage 25'. The grinding elements, and some of the larger particles of the material to be ground remain in the girnding zone 24'.

I claim:

1. A method of comminuting consisting essentially of the steps of frictionally rotating a plurality of generally spherical grinding elements substantially about the centers thereof without any significant impact therebetween, within a generally cylindrical vessel by causing relative rotation between the vessel and an agitator, in which every cross section normal to the axis thereof defines a circle, disposed coaxially in the vessel and spaced from the inner wall thereof a distance at least twice the diameter of the grinding elements, maintaining the grinding elements generally in a continuum so that the grinding elements which are not in contact with the agitator are caused to be rotated by those grinding elements which are in contact with the agitator, and passing the material to be comminuted through the spherical grinding elements so that said material is reduced in size by the shearing action between adjacent rotating grinding elements and between the rotating grinding elements and the walls of the vessel and the agitator.

2. The method of claim 1 further characterized in that the material which has been comminuted is separated from the grinding elements and the other material which is to be comminuted, through an annular passage defined by the clearance between the agitator and the generally cylindrical vessel.

3. The procedural combination of claim 2 which further includes repeating the recited method steps in a second vessel to thereby further reduce the size of the material.

4. The process of claim 1 in which the solid material is dry-ground and fed into the vessel adjacent its top, and passes down through the vessel and leaves the vessel adjacent the bottom thereof while the grinding elements remain in the vessel.

5. The process of claim 1 in which solid material and liquid enter the vessel adjacent its top and pass down through the vessel and leave the vessel adjacent the bottom thereof while the grinding elements remain in the vessel.

6. The process of claim 1 in which solid material and liquid enter the vessel adjacent its bottom and pass through the vessel and leave adjacent its top.

7. A comminution apparatus comprising an upright generally cylindrical vessel, an agitator in which every cross section normal to the axis thereof defines a circle disposed within the vessel and generally coaxial therewith, a plurality of generally spherical grinding elements disposed between the agitator and the walls of the vessel, the distance between the wall of the agitator and the wall of the vessel being at least twice the diameter of the grinding elements, the generally spherical grinding elements being generally disposed in a continuum so that both during periods of rotation and rest of the agitator, the distance between the centers of adjacent contacting elements remains substantially equal to the diameters thereof thereby producing no significant expansion of the body of grinding elements during operation of the apparatus so that upon relative rotation between the agitator and the vessel the generally spherical grinding elements are caused to be frictionally rotated substantially about the centers thereof, and without significant impact therebetween, in a planetary type of movement the distance between the agitator and the wall of the vessel and the diameter of the grinding elements being selected so that upon rotation of the agitator, the grinding elements which are in contact therewith serve to cause substantially all of the remaining grinding elements to be rotated substantially about the centers thereof.

8. The apparatus of claim 7 wherein the agitator includes a circular base of a larger diameter than the remaining portions of the agitator and the distance between the circular base and the cylindrical wall of the vessel is less than the diameter of the grinding elements and the outlet of the vessel is below said base.

9. A comminution apparatus comprising an upright generally cylindrical vessel, a generally cylindrical agitator disposed coaxially within said vessel, said agitator including a radially outwardly protruding circular base portion in proximity to the bottom of the vessel, at least one radially outwardly protruding intensifying ring on said agitator positioned above the base portion thereof, generally spherical grinding elements disposed in said vessel between the agitator and the walls of the vessel, the generally spherical grinding elements being generally disposed in a continuum so that both during periods of rotation and rest of the agitator, the distance between the centers of adjacent contacting elements remains substantially equal to the diameters thereof thereby producing no significant expansion of the body of grinding elements during operation of the apparatus the distance between the periphery of the circular base of the agitator and the circular wall of the vessel being less than the diameter of the grinding elements to thereby facilitate the separation of the comminuted material and the grinding elements.

10. The apparatus of claim 9 further characterized in that said intensifying ring includes radially outwardly convergently directed surfaces.

11. The apparatus of claim 7 in which the agitator is suspended in the vessel, the base of the agitator being circular and the wall of the vessel about said base being circular, the distance between said base and said circular wall being less than the diameter of the grinding elements, the outlet of the vessel being below said base and on the underside of the base there being a blade extending horizontally, substantially from one edge thereof to the other and extending vertically downwardly almost to the bottom of the vessel.

12. A comminution apparatus comprising first and second upright generally cylindrical vessel with fluid communication means therebetween to accommodate the flow of liquid and suspended matter from the one vessel to the other vessel, a vertical agitator within each vessel with means for rotating the same, all horizontal cross sections of each agitator and vessel defining circles and free of elongated projections and indentations, substantially spherical, grinding elements in each vessel, the distance between the wall of the agitator and the wall of the vessel being at least twice the diameter of the grinding elements, the substantially spherical grinding elements being generally disposed in a continuum so that both during periods of rotation and rest of the agitator the distance between the centers of adjacent contacting elements remains substantially equal to the diameters thereof thereby producing no significant expansion of the body of grinding elements during operation of the apparatus so that upon relative rotation between the agitator and the vessel the generally spherical grinding elements are caused to be frictionally rotated substantially about the centers thereof, and without significant impact therebetween, in a planetary type of movement, the distance between the agitator and the wall of the vessel and the diameter of the grinding elements being selected so that the grinding elements in contact with the agitator serve to cause substantially all of the remaining grinding elements to be rotated substantially about their centers.

References Cited

UNITED STATES PATENTS

| | | | |
|---|---|---|---|
| 1,605,025 | 11/1926 | Hildebrandt | 241—176 X |
| 2,595,117 | 4/1952 | Ahlmann | 241—172 X |
| 2,855,156 | 10/1958 | Hochberg | 241—46 X |
| 3,050,263 | 8/1962 | Barkman | 241—30 |
| 3,082,965 | 3/1963 | Decker | 241—153 |
| 3,149,789 | 9/1964 | Szegvari | 241—27 |
| 3,172,609 | 3/1965 | Olsen | 241—172 X |
| 3,185,398 | 5/1965 | Hughes | 241—172 X |
| 3,199,792 | 8/1965 | Norris | 241—172 X |

FOREIGN PATENTS

| | | |
|---|---|---|
| 422,628 | 1/1935 | Great Britain. |
| 736,947 | 7/1963 | Germany. |
| 848,514 | 9/1960 | Great Britain. |

GERALD A. DOST, *Primary Examiner.*

U.S. Cl. X.R.

241—43, 46, 153, 170